US008836681B2

(12) United States Patent
Parmar et al.

(10) Patent No.: US 8,836,681 B2
(45) Date of Patent: Sep. 16, 2014

(54) METHOD AND DEVICE FOR REDUCING EFFECT OF POLARITY INVERSION IN DRIVING DISPLAY

(75) Inventors: Manu Parmar, Sunnyvale, CA (US); Jeho Lee, Palo Alto, CA (US); Nao S. Chuei, San Mateo, CA (US); Koorosh Aflatooni, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 353 days.

(21) Appl. No.: 13/279,143

(22) Filed: Oct. 21, 2011

(65) Prior Publication Data

US 2013/0100100 A1 Apr. 25, 2013

(51) Int. Cl.
*G06F 3/038* (2013.01)
*G09G 3/34* (2006.01)

(52) U.S. Cl.
CPC ...... *G09G 3/3466* (2013.01); *G09G 2320/0247* (2013.01); *G09G 2310/0254* (2013.01); *G09G 2310/067* (2013.01)
USPC .............. 345/209; 345/84; 345/108; 382/264

(58) Field of Classification Search
CPC .................... G09G 3/3466; G09G 2310/0254; G09G 2320/0247; G09G 2310/067
USPC .......... 345/36-97, 211-215, 690; 257/57-98; 382/260-264
See application file for complete search history.

(56) References Cited

U.S. PATENT DOCUMENTS

| | | | | |
|---|---|---|---|---|
| 4,954,789 | A | 9/1990 | Sampsell | |
| 5,784,189 | A | 7/1998 | Bozler et al. | |
| 6,040,937 | A | 3/2000 | Miles | |
| 6,327,071 | B1 | 12/2001 | Kimura | |
| 6,469,684 | B1 | 10/2002 | Cole | |
| 6,574,033 | B1 | 6/2003 | Chui et al. | |
| 6,674,562 | B1 | 1/2004 | Miles et al. | |
| 7,042,643 | B2 | 5/2006 | Miles | |
| 7,123,216 | B1 | 10/2006 | Miles | |
| 7,289,256 | B2 | 10/2007 | Cummings et al. | |
| 7,327,510 | B2 | 2/2008 | Cummings et al. | |
| 7,415,186 | B2 | 8/2008 | Cummings et al. | |
| 7,532,194 | B2 * | 5/2009 | Chui | 345/108 |
| 7,560,299 | B2 | 7/2009 | Cummings | |
| 7,889,163 | B2 | 2/2011 | Chui et al. | |
| 7,990,604 | B2 | 8/2011 | Lee et al. | |
| 8,031,133 | B2 * | 10/2011 | Gally et al. | 345/32 |

(Continued)

OTHER PUBLICATIONS

International Search Report and Written Opinion—PCT/US2012/059050—ISA/EPO—Jan. 24, 2013.

*Primary Examiner* — Amare Mengistu
*Assistant Examiner* — Vinh Lam
(74) *Attorney, Agent, or Firm* — Knobbe Martens Olson & Bear LLP

(57) ABSTRACT

This disclosure provides systems, methods and apparatus, including computer programs encoded on computer storage media, for reducing artifacts in an image generated by a display device. In one aspect, data is written to a display and a position of display elements is maintained based on the application of a bias voltage pattern. The bias voltage pattern includes alternating polarities along one dimension in a pattern having a first frequency spectrum, and alternating polarities along a second dimension in a pattern having a second frequency spectrum that is different than the first frequency spectrum. At least one of the first and second frequency spectrums may include a plurality of frequency components.

28 Claims, 22 Drawing Sheets

(56) References Cited

U.S. PATENT DOCUMENTS

| | | | | |
|---|---|---|---|---|
| 8,310,421 | B2 * | 11/2012 | Todorovich | 345/85 |
| 8,391,630 | B2 * | 3/2013 | Mathew | 382/264 |
| 8,514,169 | B2 * | 8/2013 | Chui et al. | 345/108 |
| 2004/0032386 | A1 | 2/2004 | Pai | |
| 2005/0068282 | A1 | 3/2005 | Mizumaki | |
| 2006/0103613 | A1 * | 5/2006 | Chui | 345/85 |
| 2006/0250350 | A1 * | 11/2006 | Kothari et al. | 345/108 |
| 2007/0126673 | A1 * | 6/2007 | Djordjev et al. | 345/84 |
| 2007/0182707 | A1 | 8/2007 | Kothari | |
| 2008/0158648 | A1 | 7/2008 | Cummings | |
| 2008/0297524 | A1 | 12/2008 | Huang | |
| 2009/0225069 | A1 * | 9/2009 | Sampsell | 345/212 |
| 2010/0026680 | A1 * | 2/2010 | Chui et al. | 345/214 |
| 2010/0182308 | A1 * | 7/2010 | Holman et al. | 345/214 |
| 2010/0245313 | A1 | 9/2010 | Lewis et al. | |
| 2011/0164068 | A1 | 7/2011 | Todorovich | |
| 2013/0100109 | A1 | 4/2013 | Lee et al. | |

* cited by examiner

Common Voltages

| Segment Voltages | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

| | |
|---|---|
| 1 | -1 |
| -1 | 1 |
| 1 | -1 |
| -1 | 1 |
| -1 | 1 |
| 1 | -1 |
| -1 | 1 |
| -1 | 1 |
| 1 | -1 |
| -1 | 1 |
| 1 | -1 |
| -1 | 1 |
| -1 | 1 |
| -1 | 1 |
| -1 | 1 |
| 1 | -1 |
| 1 | -1 |
| 1 | -1 |
| -1 | 1 |
| 1 | -1 |
| -1 | 1 |
| 1 | -1 |
| -1 | 1 |
| 1 | -1 |
| 1 | -1 |
| -1 | 1 |
| -1 | 1 |
| 1 | -1 |
| -1 | 1 |
| 1 | -1 |
| -1 | 1 |
| 1 | -1 |
| -1 | 1 |
| 1 | -1 |
| -1 | 1 |
| -1 | 1 |
| 1 | -1 |
| -1 | 1 |

| | |
|---|---|
| -1 | 1 |
| 1 | -1 |
| 1 | -1 |
| 1 | -1 |
| -1 | 1 |
| -1 | 1 |
| -1 | 1 |
| 1 | -1 |
| -1 | 1 |
| 1 | -1 |
| 1 | -1 |
| 1 | -1 |
| -1 | 1 |
| 1 | -1 |
| 1 | -1 |
| -1 | 1 |
| 1 | -1 |
| -1 | 1 |
| -1 | 1 |
| 1 | -1 |
| 1 | -1 |
| -1 | 1 |
| 1 | -1 |
| -1 | 1 |
| 1 | -1 |
| -1 | 1 |
| -1 | 1 |
| 1 | -1 |
| 1 | -1 |
| -1 | 1 |
| 1 | -1 |
| -1 | 1 |
| 1 | -1 |
| 1 | -1 |
| -1 | 1 |
| 1 | -1 |
| 1 | -1 |
| -1 | 1 |
| -1 | 1 |
| -1 | 1 |
| 1 | -1 |
| 1 | -1 |
| -1 | 1 |
| 1 | -1 |
| -1 | 1 |
| 1 | -1 |
| -1 | 1 |
| 1 | -1 |

Figure 15B

| | |
|---|---|
| -1 | 1 |
| 1 | -1 |
| 1 | -1 |
| -1 | 1 |
| -1 | 1 |
| 1 | -1 |
| -1 | 1 |
| 1 | -1 |
| 1 | -1 |
| -1 | 1 |
| 1 | -1 |
| 1 | -1 |
| -1 | 1 |
| -1 | 1 |
| -1 | 1 |
| -1 | 1 |
| 1 | -1 |
| 1 | -1 |
| -1 | 1 |
| -1 | 1 |
| 1 | -1 |
| 1 | -1 |
| 1 | -1 |
| 1 | -1 |
| 1 | -1 |
| -1 | 1 |
| -1 | 1 |
| -1 | 1 |
| -1 | 1 |
| 1 | -1 |
| 1 | -1 |
| -1 | 1 |
| 1 | -1 |
| -1 | 1 |
| 1 | -1 |
| 1 | -1 |
| -1 | 1 |
| 1 | -1 |
| -1 | 1 |
| -1 | 1 |
| -1 | 1 |
| 1 | -1 |

Figure 15C

METHOD AND DEVICE FOR REDUCING EFFECT OF POLARITY INVERSION IN DRIVING DISPLAY

TECHNICAL FIELD

This disclosure relates to methods and systems for driving a display including electromechanical display elements. In particular, this disclosure relates to reducing artifacts displayed by an interferometric modulator display

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

SUMMARY

The systems, methods and devices of the disclosure each have several innovative aspects, no single one of which is solely responsible for the desirable attributes disclosed herein.

One innovative aspect of the subject matter described in this disclosure can be implemented in a method of displaying an image on a display. The display may include display elements arranged in an array having a first direction and a second direction that intersects the first direction. The method includes writing image data to the array of display elements, and maintaining a current position of each display element of the array of display elements. Maintaining a current position includes alternating the polarity of a first voltage signal along the first direction in a first pattern having a first frequency spectrum, and alternating the polarity of a second voltage signal along the second direction in a second pattern having a second frequency spectrum. At least one of the first and second frequency spectrums includes a plurality of frequency components.

Another innovative aspect of the subject matter described in this disclosure can be implemented in an apparatus for driving a display. The display may include display elements arranged in an array having a first direction and a second direction that intersects the first direction. The apparatus includes a first driver configured to drive the array of display elements, the first driver including a plurality of first driving signal lines connected to the array of display elements along the first direction, and a second driver to drive the array of display elements, the second driver including a plurality of second driving signal lines connected to the array of display elements along the second direction. The first driver is configured to maintain a current position of each display element of the array of display elements by alternating a polarity of the plurality of first driving signal lines in a first pattern having a first frequency spectrum. The second driver is configured to alternate the polarity of the plurality of second driver signal lines in a second pattern having a second frequency spectrum. At least one of the first and second frequency spectrums includes a plurality of frequency components.

Another innovative aspect of the subject matter described in this disclosure can be implemented in an apparatus for displaying an image on a display. The display may include display elements arranged in an array having a first direction and a second direction that intersects the first direction. The apparatus includes means for writing image data to the array of display elements, and means maintaining a current position of each display element of the array of display elements. The means for maintaining a current position includes means for alternating the polarity of a first voltage signal along the first direction in a first pattern having a first frequency spectrum, and means for alternating the polarity of a second voltage signal along the second direction in a second pattern having a second frequency spectrum. At least one of the first and second frequency spectrums includes a plurality of frequency components Another innovative aspect of the subject matter described in this disclosure can be implemented in a computer program product for processing data for a program configured to drive a display including a plurality display elements arranged in an array having a first direction and a second direction that intersects the first direction. The computer program product includes a non-transitory computer-readable medium having stored thereon code for causing processing circuitry to write image data to the array of display elements, and maintain a current position of each display element of the array of display elements. Maintaining a current position includes alternating the polarity of a first voltage signal along the first direction in a first pattern having a first frequency spectrum, and alternating the polarity of a second voltage signal along the second direction in a second pattern having a second frequency spectrum. At least one of the first and second frequency spectrums includes a plurality of frequency components.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 15A-15C collectively illustrate an example of a pseudo-random bias voltage pattern according to some implementations.

Like reference numbers and designations in the various drawings indicate like elements.

DETAILED DESCRIPTION

Figure 1:
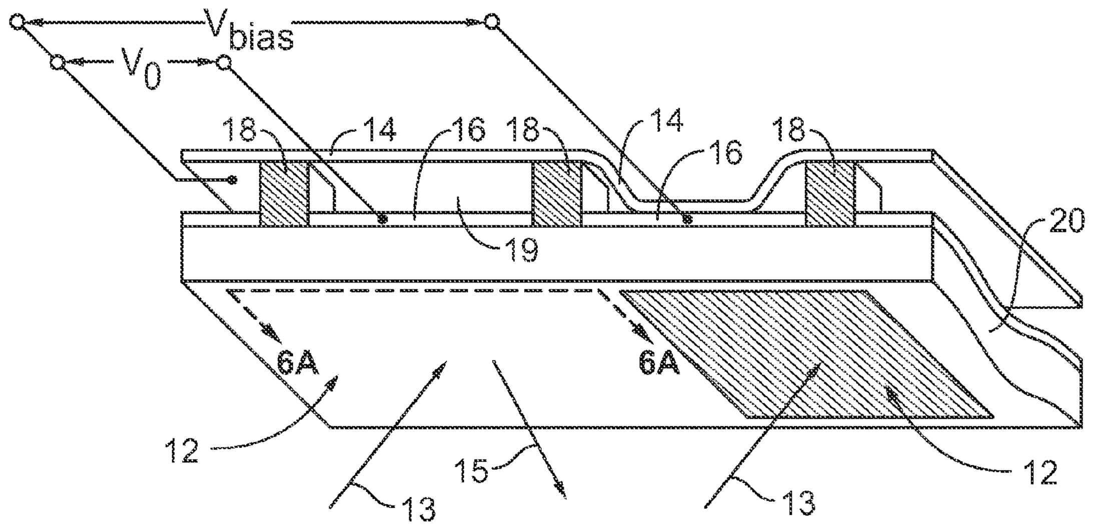
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

A display device, such as a reflective display device, may include an array of display elements. In some examples, driving signals may be used which produce the same polarity potential difference across two electrodes which are configured to actuate and release a display element, such as an interferometric modulator. In other examples, driving signals can be used which alternate the polarity of the potential difference across the display element. Alternation of the polarity across a display element may reduce or inhibit charge accumulation on the electrodes which could occur following a period of the same polarity voltage difference across the display element.

Sometimes, between frame updates, the display elements may be maintained in a hold state by application of a bias voltage. The bias voltage may include hold voltages that are applied along one dimension of the array of display elements, and segment voltages that are applied along the other dimension. To reduce or inhibit charge accumulation in the display, the polarity of the bias voltage applied to different display elements may be alternated as discussed above. In some examples, the hold voltages have a magnitude such that alternation of the polarity of the hold voltage results in an alternation of the polarity of the potential across a display element, regardless of the magnitude of the segment voltage.

During a hold state, there may exist some variations in the magnitude of the bias voltage (e.g., the difference between the hold voltage and the segment voltage across a display element) for different display elements, and light reflected by the display elements may be different based on the variations of bias voltage even though the image data being displayed may be the same. To reduce the effect of the variation, a bias voltage pattern may be used which includes high frequency components such that the variations are less perceptible to a user. Further, frequency components of the bias voltage pattern may be set to include lower frequency components in one dimension such that they do not negatively interfere with an image data pattern used to write image data to a display.

Particular implementations of the subject matter described in this disclosure can be implemented to realize one or more of the following potential advantages. By maintaining high frequency components in a bias voltage pattern, the bias voltage pattern perceived in a displayed image may be reduced. Further, by adjusting the frequency components of a bias voltage pattern during a hold state, visual artifacts resulting from an interference of image data and the bias voltage pattern can be reduced.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when actuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows indicating light 13 incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1000 um, while the gap 19 may be on the order of <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
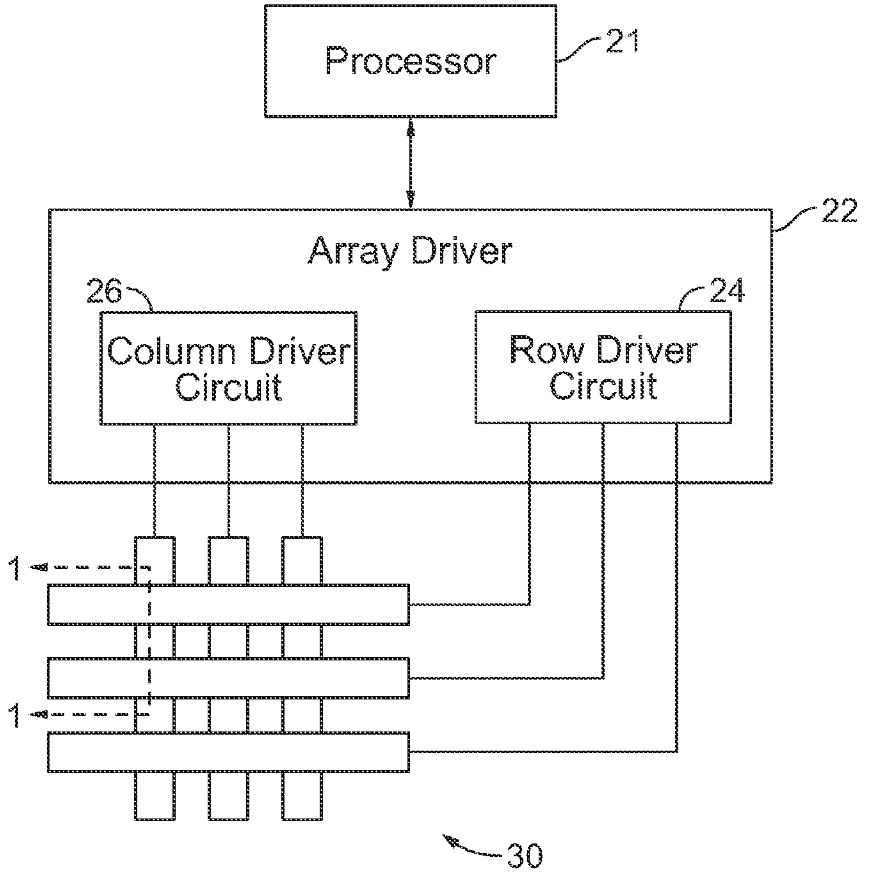
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
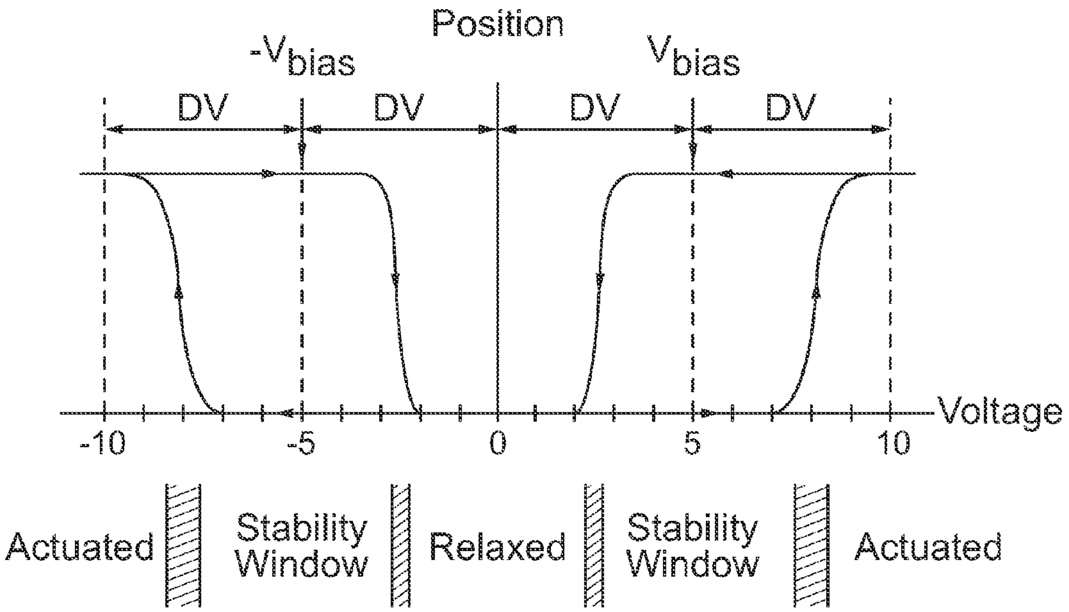
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
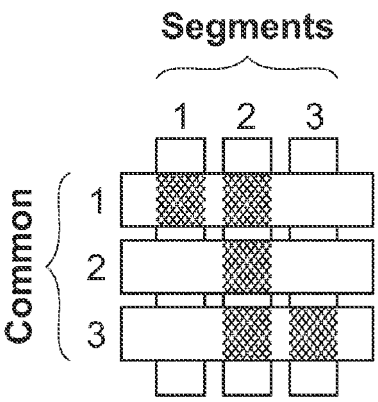
FIG. 5A shows an example of a diagram illustrating a frame of display data in the 3×3 interferometric modulator display of FIG. 2.
Figure 5B:
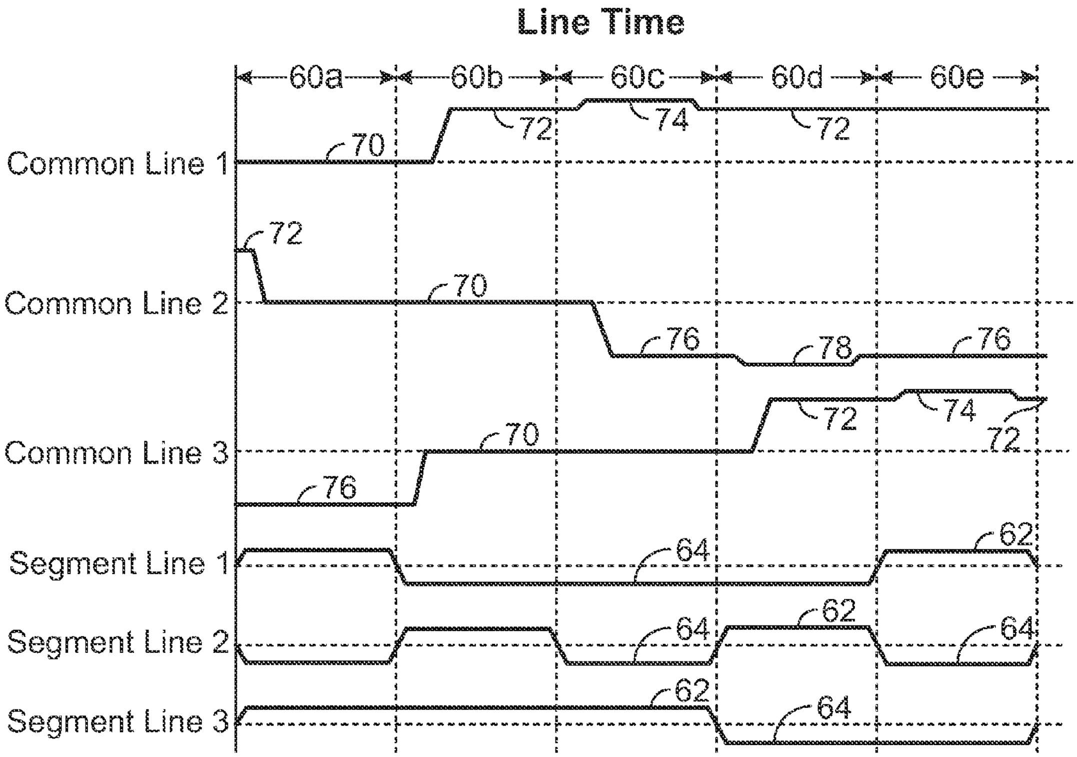
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60*e* display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60*a*.

During the first line time 60*a*: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60*a*, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60*a* (i.e., $VC_{REL}$—relax and $VC_{HOLD\_L}$—stable).

During the second line time 60*b*, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60*c*, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60*c*, the voltage along common line 2 decreases to a low hold voltage 76, and the voltage along common line 3 remains at a release voltage 70, leaving the modulators along common lines 2 and 3 in a relaxed position.

During the fourth line time 60*d*, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state. Then the voltage on common line 2 transitions back to the low hold voltage 76.

Finally, during the fifth line time 60*e*, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60*e*, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60*a*-60*e*) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
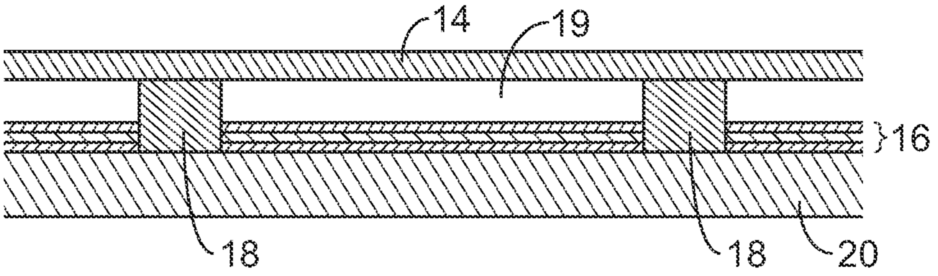
FIG. 6A shows an example of a partial cross-section of the interferometric modulator display of FIG. 1.
Figure 6B:
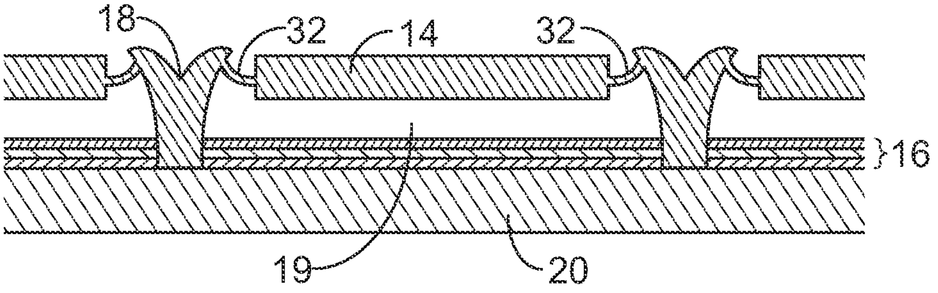
FIGS. 6B-6E show examples of cross-sections of varying implementations of interferometric modulators.
Figure 6C:
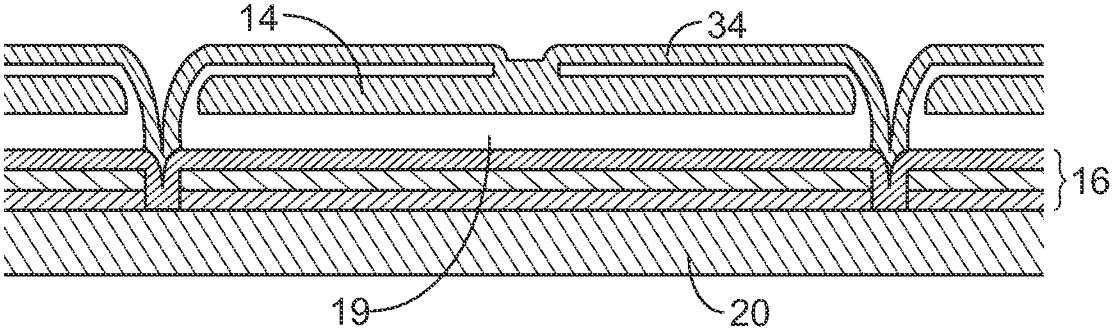

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
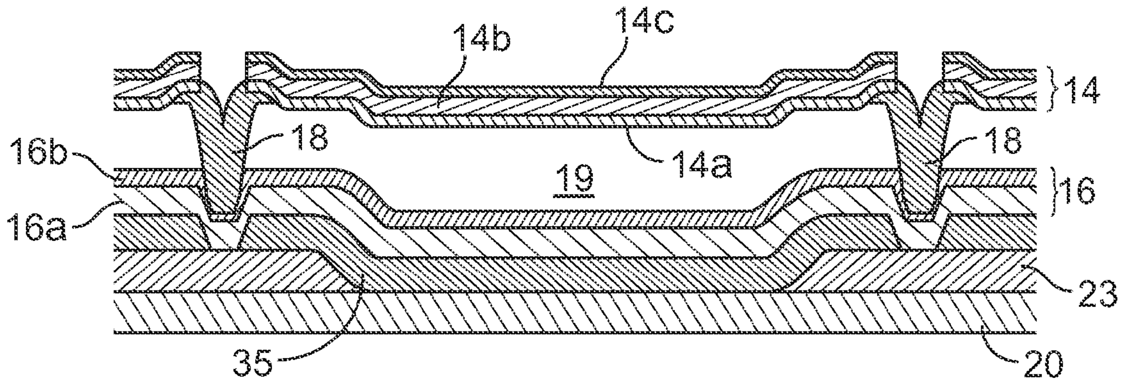

FIG. 6D shows another example of an IMOD, where the movable reflective layer 14 includes a reflective sub-layer 14*a*. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14*c*, which may be configured to serve as an electrode, and a support layer 14*b*. In this example, the conductive layer 14*c* is disposed on one side of the support layer 14*b*, distal from the substrate 20, and the reflective sub-layer 14*a* is disposed on the other side of the support layer 14*b*, proximal to the substrate 20. In some implementations, the reflective sub-layer 14*a* can be conductive and can be disposed between the support layer 14*b* and the optical stack 16. The support layer 14*b* can include one or more layers of a dielectric material, for example, silicon oxynitride (SiON) or silicon dioxide ($SiO_2$). In some implementations, the support layer 14*b* can be a stack of layers, such as, for example, a $SiO_2$/SiON/$SiO_2$ tri-layer stack. Either or both of the reflective sub-layer 14*a* and the conductive layer 14*c* can include, e.g., an aluminum (Al) alloy with about 0.5% copper (Cu), or another reflective metallic material. Employing conductive layers 14*a*, 14*c* above and below the dielectric support layer 14*b* can balance stresses and provide enhanced conduction. In some implementations, the reflective sub-layer 14*a* and the conductive layer 14*c* can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16*a* from the conductive layers in the black mask 23.

Figure 6E:
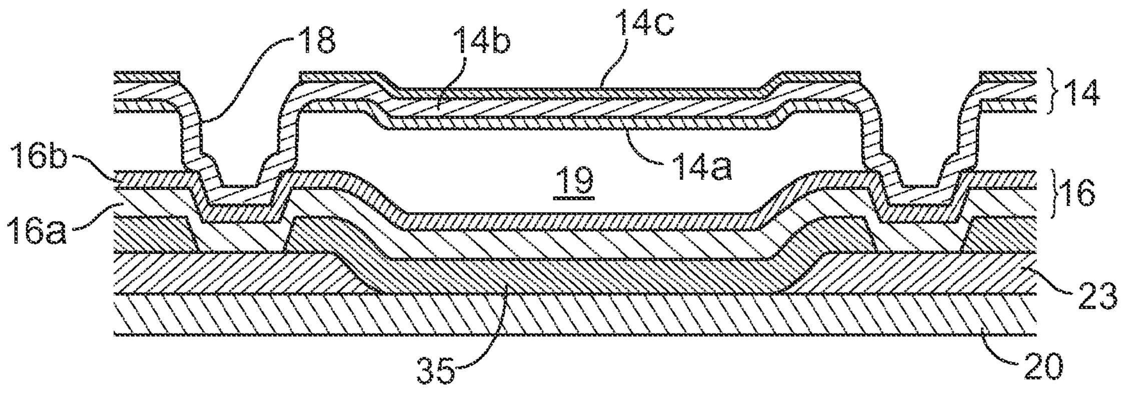

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16*a*, and a dielectric 16*b*. In some implementations, the optical absorber 16*a* may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
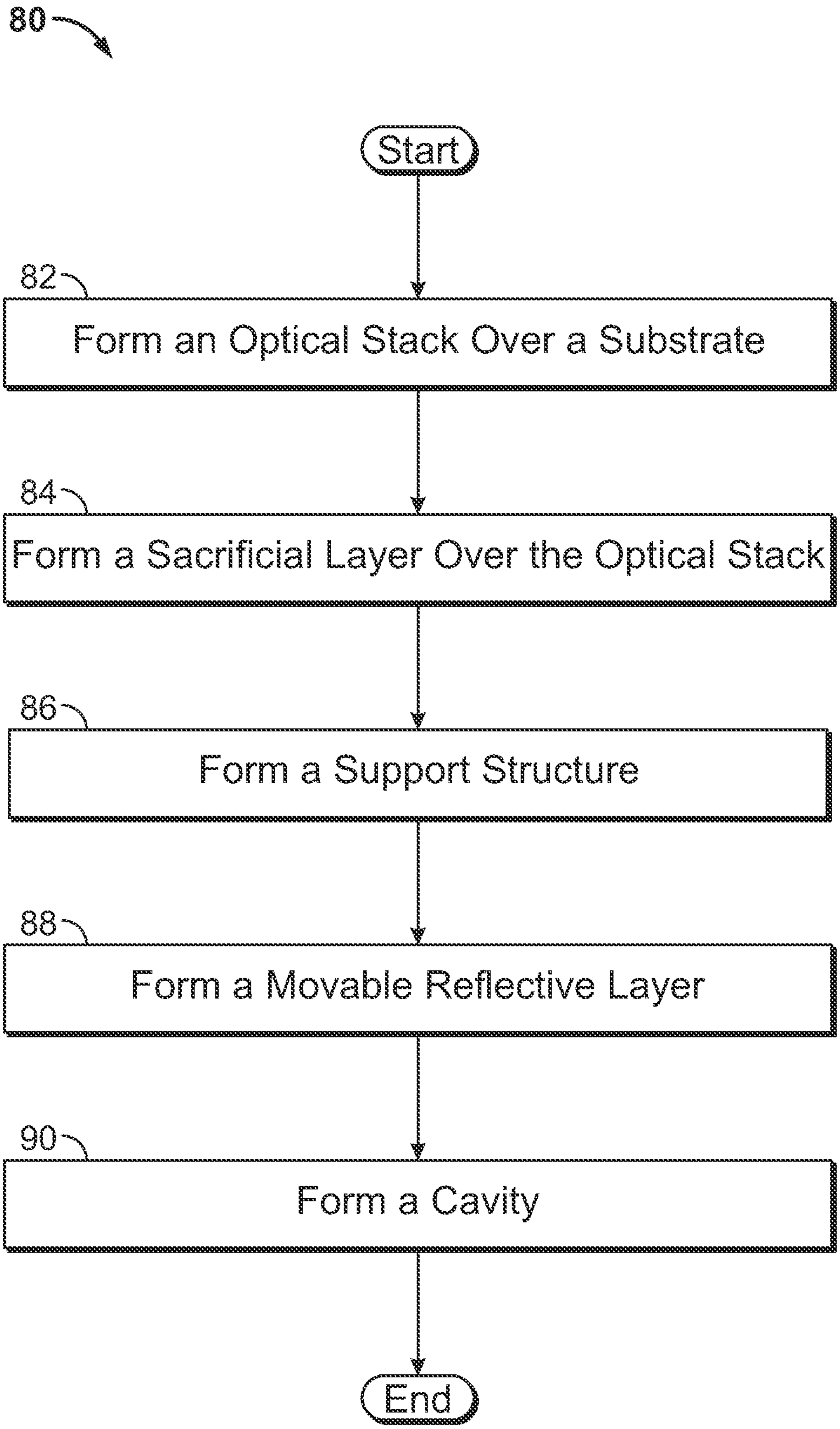
FIG. 7 shows an example of a flow diagram illustrating a manufacturing process for an interferometric modulator.
Figure 8A:
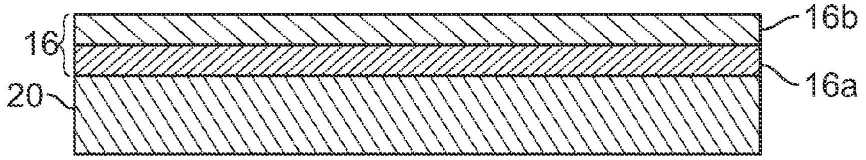
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16*a* and 16*b*, although more or fewer sub-layers may be included in some other implementations. In some implementations, one of the sub-layers 16*a*, 16*b* can be configured with both optically absorptive and conductive properties, such as the combined conductor/absorber sub-layer 16*a*. Additionally, one or more of the sub-layers 16*a*, 16*b* can be patterned into parallel strips, and may form row electrodes in a display device. Such patterning can be performed by a masking and etching process or another suitable process known in the art. In some implementations, one of the sub-layers 16*a*, 16*b* can be an insulating or dielectric layer, such as sub-layer 16*b* that is deposited over one or more metal layers (e.g., one or more reflective and/or conductive layers). In addition, the optical stack 16 can be patterned into individual and parallel strips that form the rows of the display.

Figure 8B:
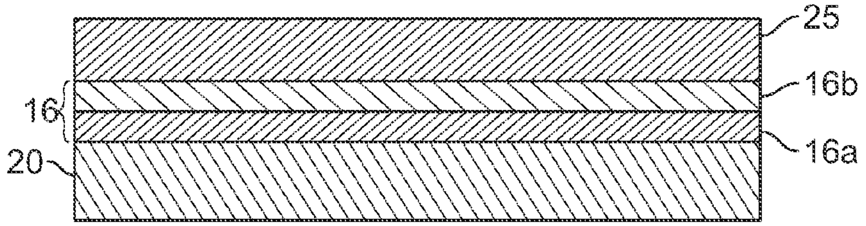

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
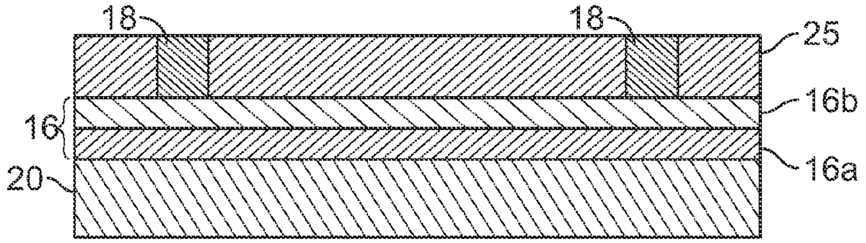

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
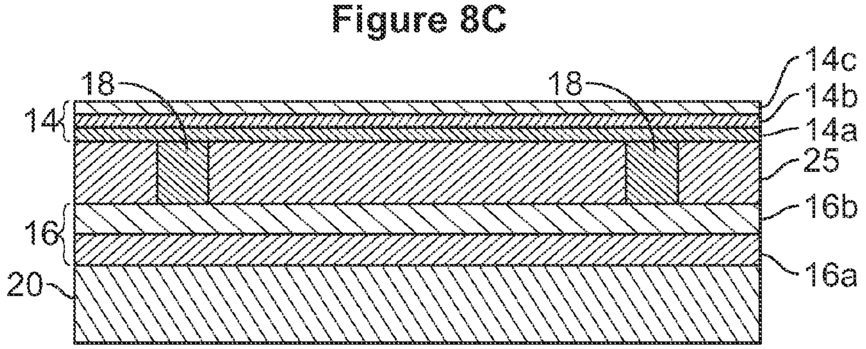
Figure 8E:
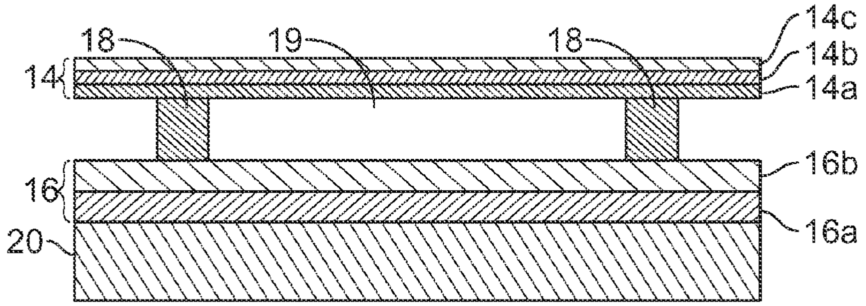

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14*a*, 14*b*, 14*c* as shown in FIG. 8D. In some implementations, one or more of the sub-layers, such as sub-layers 14*a*, 14*c*, may include highly reflective sub-layers selected for their optical properties, and another sub-layer 14*b* may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Figure 9:
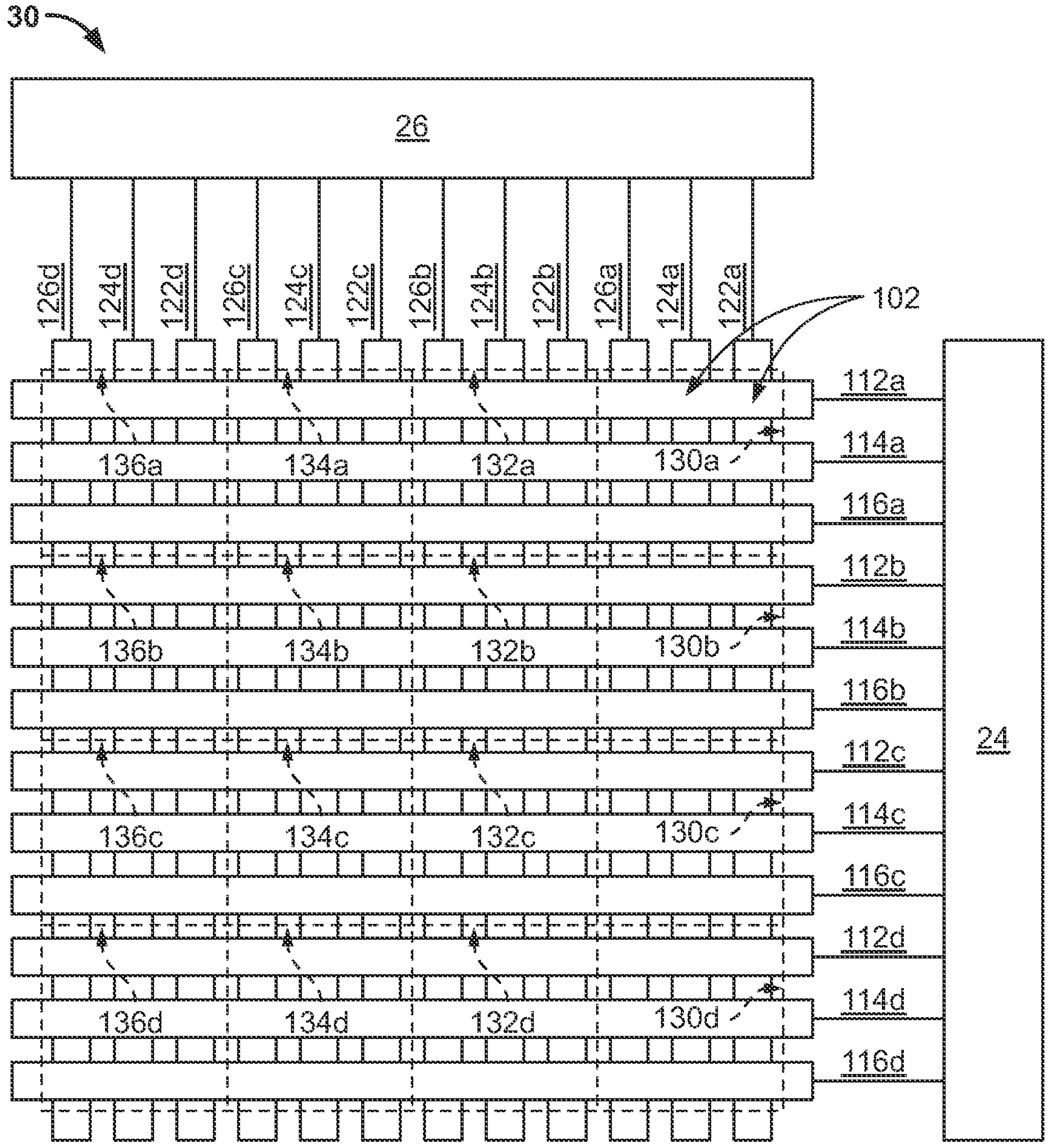
FIG. 9 schematically illustrates an example of an array of display elements including a plurality of common lines and a plurality of segment lines.

FIG. 9 schematically illustrates an example of an array of display elements 102 including a plurality of common lines 112_a-d_, 114_a-d_, and 116_a-d_ and a plurality of segment lines 122_a-d_, 124_a-d_, and 126_a-d_. In some implementations, the display elements 102 may include interferometric modulators. The plurality of segment electrodes or segment lines 122_a-d_, 124_a-d_, and 126_a-d_ and the plurality of common electrodes or common lines 112_a-d_, 114_a-d_, and 116_a-d_ can be used to address the display elements 102, as each display element 102 will be in electrical communication with one of the segment electrodes 122_a-d_, 124_a-d_, and 126_a-d_ and one of the common electrodes 112_a-d_, 114_a-d_, and 116_a-d_. Segment driver circuitry 26 is configured to apply desired voltage waveforms to each of the segment electrodes 122_a-d_, 124_a-d_, and 126_a-d_, and common driver circuitry 24 is configured to apply desired voltage waveforms to each of the column electrodes 112_a-d_, 114_a-d_, and 116_a-d_. The voltage waveforms may, for example, be as described above with reference to FIG. 5B.

Still with reference to FIG. 9, in an implementation in which the display 30 includes a color display or a monochrome grayscale display, the individual display elements 102 (such as interferometric modulators) may be arranged in groups of display elements 102 that each corresponds to a pixel, wherein the pixel includes some number of display elements 102. In an implementation in which the array includes a color display including a plurality of display elements 102, the various colors may be aligned along common lines, such that substantially all of the display elements 102 along a given common line include display elements 102 configured to display the same color. Certain implementations of color displays include alternating lines of red, green, and blue display elements 102. For example, common lines 112_a-d_ may be used to drive corresponding rows of red display elements 102, common lines 114_a-d_ may be used to drive corresponding rows of green display elements 102, and common lines 116_a-d_ may be used to drive corresponding rows of blue display elements 102. In one implementation, each 3×3 array of display elements 102 forms a pixel such as pixels 130_a_-130_d_, 132_a_-132_d_, 134_a_-134_d_, and 136_a_-136_d_. Although FIG. 9 is illustrated as a four by four pixel array for clarity of detailed illustration, many more pixels are generally provided. In an extended graphics array (XGA) format, for example, the array may be 1024 pixels along the segment line direction, and 768 pixels along the common line direction.

The state of each display element (e.g., actuated or non-actuated) is based on the image data written to the display. A hold state may be used to maintain a current position of each of the display elements 102 in the array. For example, to display a static image for a particular time period, a hold state may be used for maintaining a current position of each of the display elements 102 in the array. Such a situation may occur, for example, when a home screen is being displayed while waiting for user input, or a slide of a presentation is being displayed prior to advancing to a subsequent slide. Maintaining the display array in a hold state can consume much less energy than continuously refreshing the same display data as is often done with conventional display panels.

To maintain a display element 102 in the current position, a hold voltage +/−$V_{ch}$ (also referred to as $VC_{HOLD\_H}$ and $VC_{HOLD\_L}$ with reference to FIG. 4) may be applied to a common line connected to the display element 102. A segment line voltage applied to a display element 102 may take on values of +/−$V_s$ (also referred to as $VS_H$ and $VS_L$ with reference to FIG. 4). The hold voltages +/−$V_{ch}$ and the segment voltages +/−$V_s$ may be set such that a potential difference across the display element 102 (which is the hold voltage minus the segment voltage) is maintained within the stability window (such as discussed above with reference to FIG. 3), regardless of the polarity of the segment voltage and the polarity of the hold voltage being applied. For example, a potential difference of ($V_{ch}$−$V_s$), ($V_{ch}$+$V_s$), (−$V_{ch}$−$V_s$), or (−$V_{ch}$+$V_s$) may all have a magnitude that will maintain the display element 102 in the current position.

Figure 10:
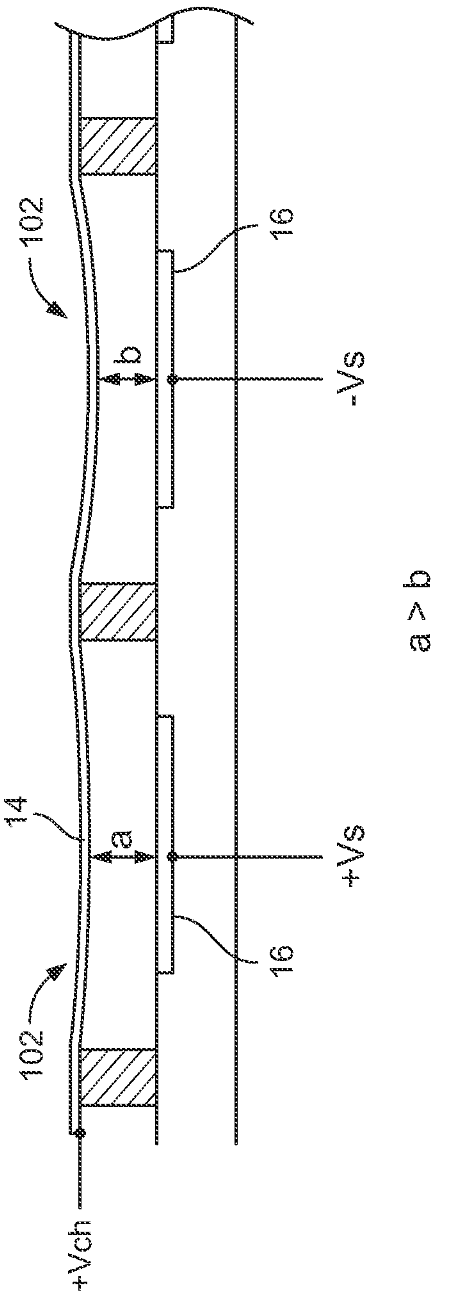
FIG. 10 illustrates an example of the variation in gap height with application of different hold state bias voltages across a display element.

Although all of these potential differences are configured to maintain a display element 102 in a current position, different magnitudes of potential difference during the hold state may impact light reflected by the display element 102, which can include an IMOD. Even when within the stability window, larger magnitude voltage differences between the reflective layer 14 and the optical stack 16 of the IMOD (such as the IMOD 12 illustrated in FIG. 1) may pull the reflective layer 14 closer to the optical stack 16. FIG. 10 illustrates an example of the variation in gap height with application of different hold state bias voltages across a display element 102. As illustrated in FIG. 10, when the magnitude of the potential difference across the display element is the sum of the magnitudes of $V_{ch}$ and $V_s$ this may result in a display element 102 exhibiting a smaller gap between the electrodes of the reflective layer 14 and the optical stack 16 than when the magnitude of the potential difference is the difference between the magnitudes of $V_{ch}$ and $V_s$. This effect may result from a greater attraction between the electrode of the reflective layer 14 and the electrode of the optical stack 16 at the greater magnitude voltage difference. For example, if the hold state voltage $V_{ch}$ applied to the common lines is either +12 V or −12 V, and if the hold state segment voltage applied to the segment lines is +3 V or −3 V, then a given display element in a hold state may see a magnitude of potential difference of either 9 V or 15 V. For a released display element, a 15 V potential difference will pull the electrodes together more than a 9 V potential difference. Such a difference in gap height for the display element 102 is illustrated conceptually in FIG. 10, where relative dimensions are not to scale. As illustrated in FIG. 10, at a voltage difference $\Delta V_1$ equal to $V_{ch}$−$V_s$, the gap height of the display element 102 is equal to a distance a. At a voltage difference $\Delta V_2$ equal to $V_{ch}$+$V_s$, the gap height of the display element 102 is equal to a distance b, which is less than the distance a. As a result of these differences in the hold states, display elements 102 may exhibit some amount of variation in reflecting light because the interference principles upon which they are based are dependent on the gap height.

During periods of time when a single image is held on the display 30, even if the voltage across all of the display elements 102 is within the stability window, it is possible that these variations in the position of the reflective layer 14 due to different magnitude hold voltages produce visible differences in reflective properties. For example, a user's visual system may be sensitive to color differences produced between the gap height of display elements 102 corresponding to one bias voltage applied to some display elements 102 and a different magnitude bias voltage that is applied to other display elements 102 in the array. Based on the driving voltages, a difference in luminance may be significant (e.g., >10% or even >30%) between the two bias voltage states (e.g., $V_{ch}-V_s$ and $V_{ch}+V_s$).

Figure 11A:
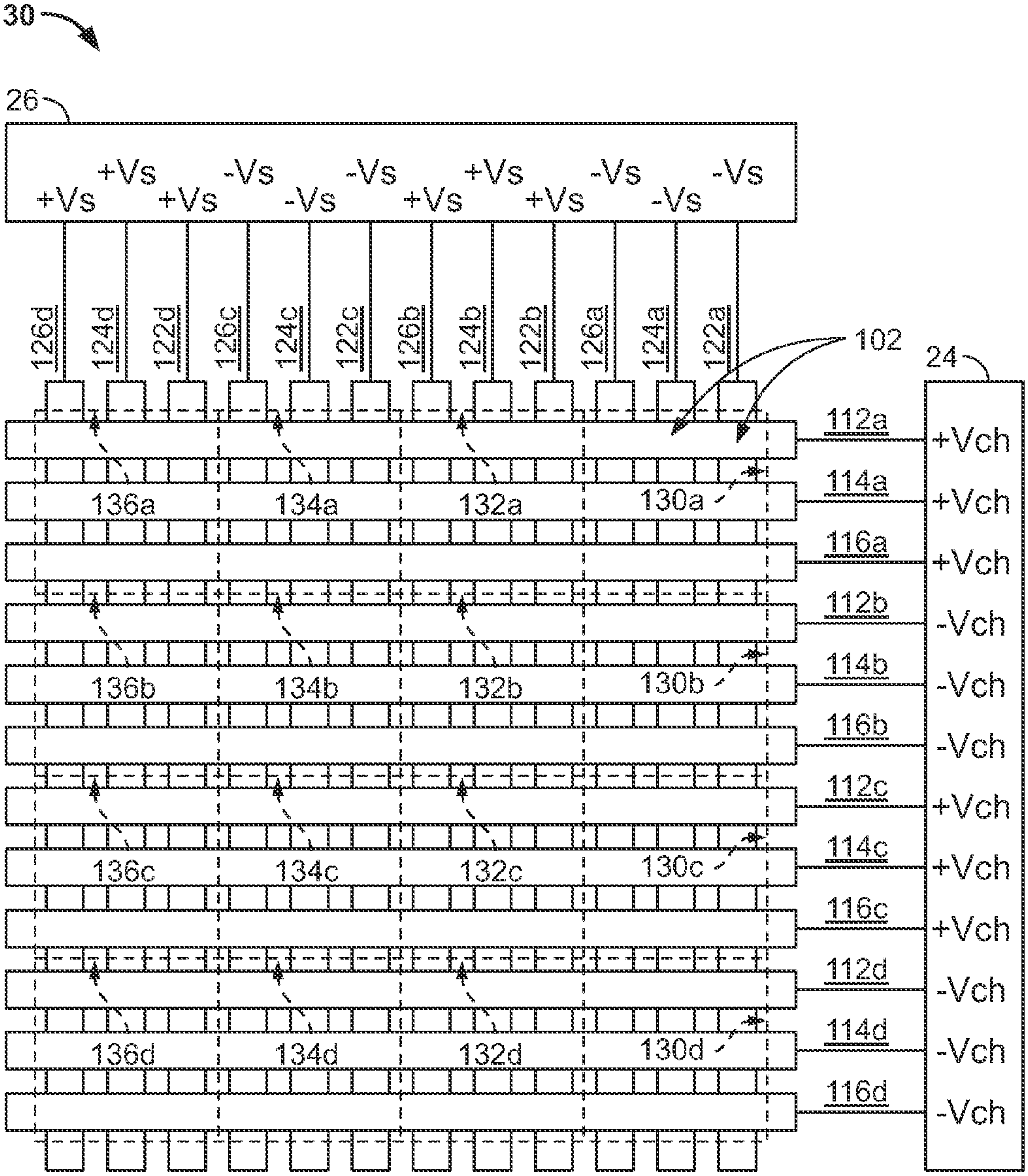
FIGS. 11A-11B illustrate an example bias voltage pattern for driving a display during a hold state.
Figure 11B:
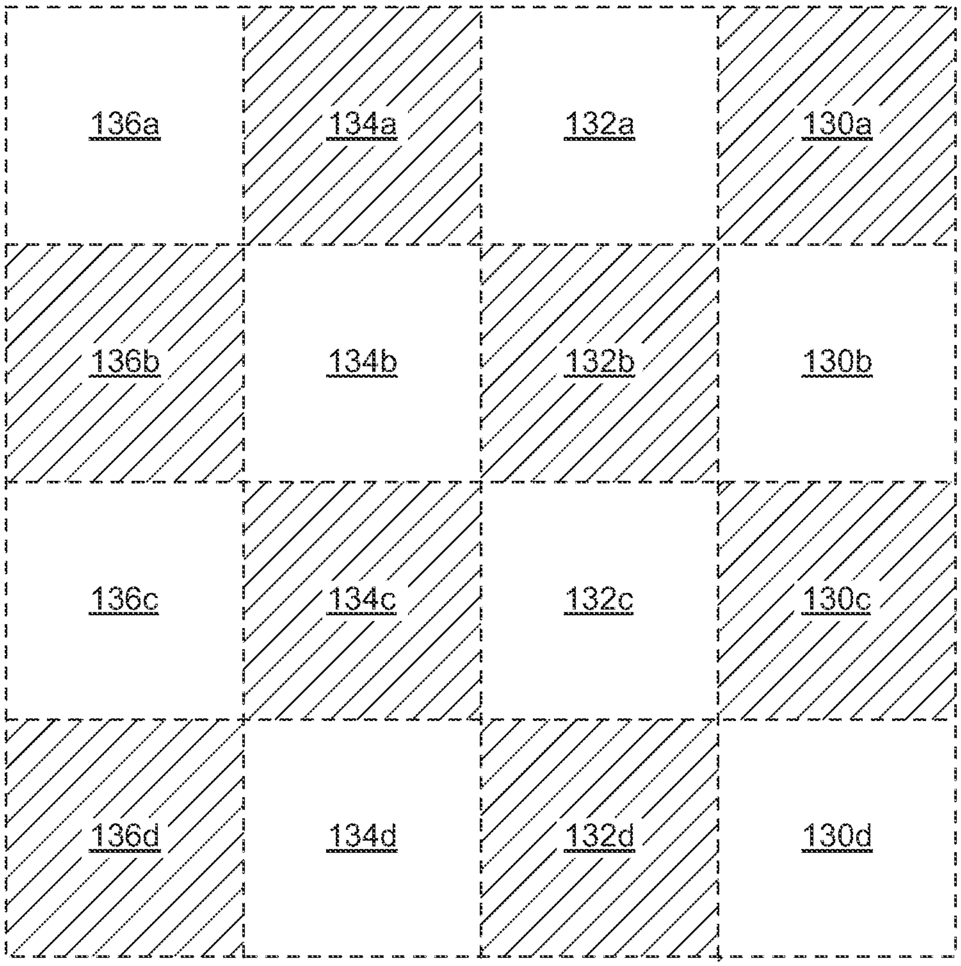

These differences can be made less visually apparent by controlling the pattern of hold state bias voltages that are used for different display elements of the array. FIGS. 11A-11B illustrate an example bias voltage pattern for driving a display 30 during a hold state. As illustrated in FIG. 11A, the common lines (e.g., 112*a-d*, 114*a-d*, and 116*a-d*) configured to drive the array of display elements 102 may be set to have alternating polarities (e.g., $+V_{ch}$, $-V_{ch}$, $+V_{ch}$, $-V_{ch}$) from pixel to pixel. Similarly, the segment lines may also be set to have alternating polarities (e.g., $+V_s$, $-V_s$, $+V_s$, $-V_s$, $+V_s$) from pixel to pixel. This results in a checkerboard pattern of pixel hold state voltage magnitudes as illustrated in FIG. 11B, where the white pixels (e.g., 136*a*, 136*c*, etc.) correspond to pixels at the lower magnitude potential difference (e.g., $V_{ch}-V_s$ or $-V_{ch}+V_s$) during the hold state, and the cross-hatched pixels (e.g., 136*b*, 136*d*, etc.) correspond to pixels at the higher magnitude potential difference (e.g., $V_{ch}+V_s$ or $-V_{ch}-V_s$) during the hold state.

With this driving scheme, during a hold state for the display elements 102, the visually perceptible effect of the variation of the reflected light by each pixel as viewed by a user is reduced since the frequency of variation of the pixels is greater than that which can be perceived accurately by the human visual system. In the driving scheme of FIG. 11A, the frequency at which the common line driving signals (e.g., X direction) alternate from pixel to pixel is at the maximum possible rate (e.g., alternation of polarity every three lines as each pixel is three lines wide). In some examples (not illustrated), the maximum possible rate may be an alternation of polarity along each consecutive line in the array along the X direction. Similarly, the frequency at which the segment line driving signals (e.g., Y direction) alternate from pixel to pixel is also at the maximum possible rate (e.g., alternation of polarity every three lines). Further, while not illustrated, the maximum possible rate along the Y direction may be an alternation of polarity along each consecutive line in the array along the Y direction.

Figure 12A:
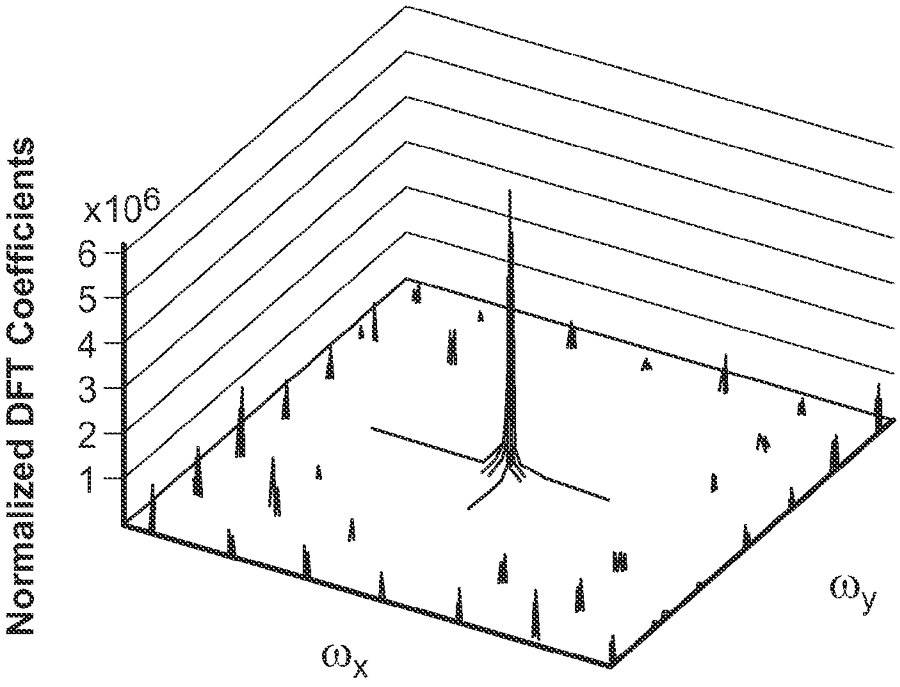
FIGS. 12A and 12B illustrate a frequency domain representation of display data with and without an applied checkerboard bias voltage pattern.
Figure 12B:
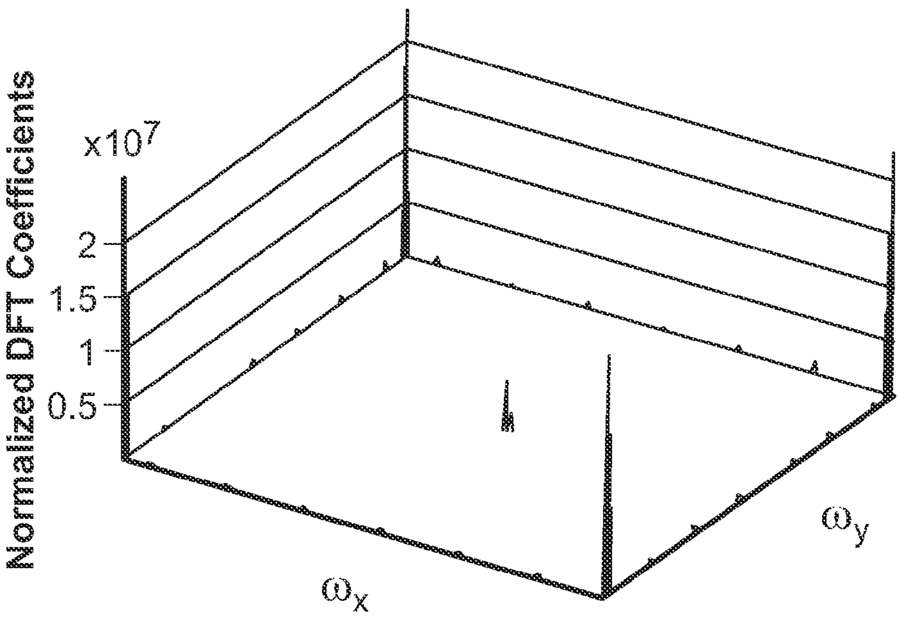

FIGS. 12A and 12B illustrate a frequency domain representation of display data with and without a checkerboard bias voltage pattern. FIG. 12A illustrates a plot of normalized discrete fourier transform (DFT) coefficients of an image data pattern. FIG. 12B illustrates a plot of DFT coefficients of an image generated which includes luminance differences induced by a checkerboard bias voltage polarity pattern as discussed with reference to FIGS. 11A and 11B. As illustrated in FIG. 12B, the checkerboard bias voltage pattern appears as a relatively large energy spike at the highest frequencies in both the X and Y dimensions. The spike is present at the four corners of the plot of FIG. 12B, which corresponds to positions of highest frequency in both the X and Y dimensions. In the illustrated example, the energy in the checkerboard bias voltage pattern spike is much higher (e.g., about $1.5\times10^7$) than the energy of the baseband image data pattern (e.g., about $4\times10^6$). However, the checkerboard bias voltage pattern appears at very high frequency components such that it will be less perceptible to a user.

Although the high frequency pattern described with reference to FIGS. 11A-B helps hide the effects of the polarity variations, the checkerboard pattern caused by these variations in the position of the reflective layer 14 can interact with a halftone or dithering pattern in the image being displayed and lead to visible artifacts. For example, in some implementations, a display device may be provided with image data that has a greater number of colors than the number of colors that the display device can display. In such an implementation, for example, for a black and white display device, the display elements 102 of the array may be set such that a net effect may produce gradations of black and white (e.g., a grayscale) for displaying an image to a user. Other image processing techniques may also be implemented to generate additional colors in a displayed image.

Such techniques for generating gradations of color and shading over image regions are well known. In some methods, image data can be intentionally randomized and/or quantization errors can be distributed among neighboring pixels by image data processing, which is generally referred to as "dithering." There are a variety of dithering techniques for processing image data. Examples of dithering techniques include, but are not limited to, error-diffusion dithering (for example, Floyd-Steinberg dithering, Jarvis, Judice, and Ninke dithering, Stucki dithering, Burkes dithering, Scolorq dithering, Sierra dithering, Filter Lite dithering, Atkinson dithering, Hilbert-Peano dithering), and model-based dithering (for example, Direct Binary Search (DBS)). Dithering improves image quality by adding noise to the image that disrupts the visual patterns that would otherwise result.

The checkerboard bias voltage pattern described above may distort a halftone or dithering pattern within a region of frequency space corresponding to the checkerboard bias voltage pattern. For example, input image values that have values near the mid point of quantization levels associated with halftone patterns that are similar to the checkerboard bias voltage pattern may be adversely interfered with by the checkerboard bias voltage pattern. A halftone pattern which applies a 50% fill rate in a particular region of an image may be especially susceptible to distortion with the checkerboard bias voltage pattern.

Figure 13:
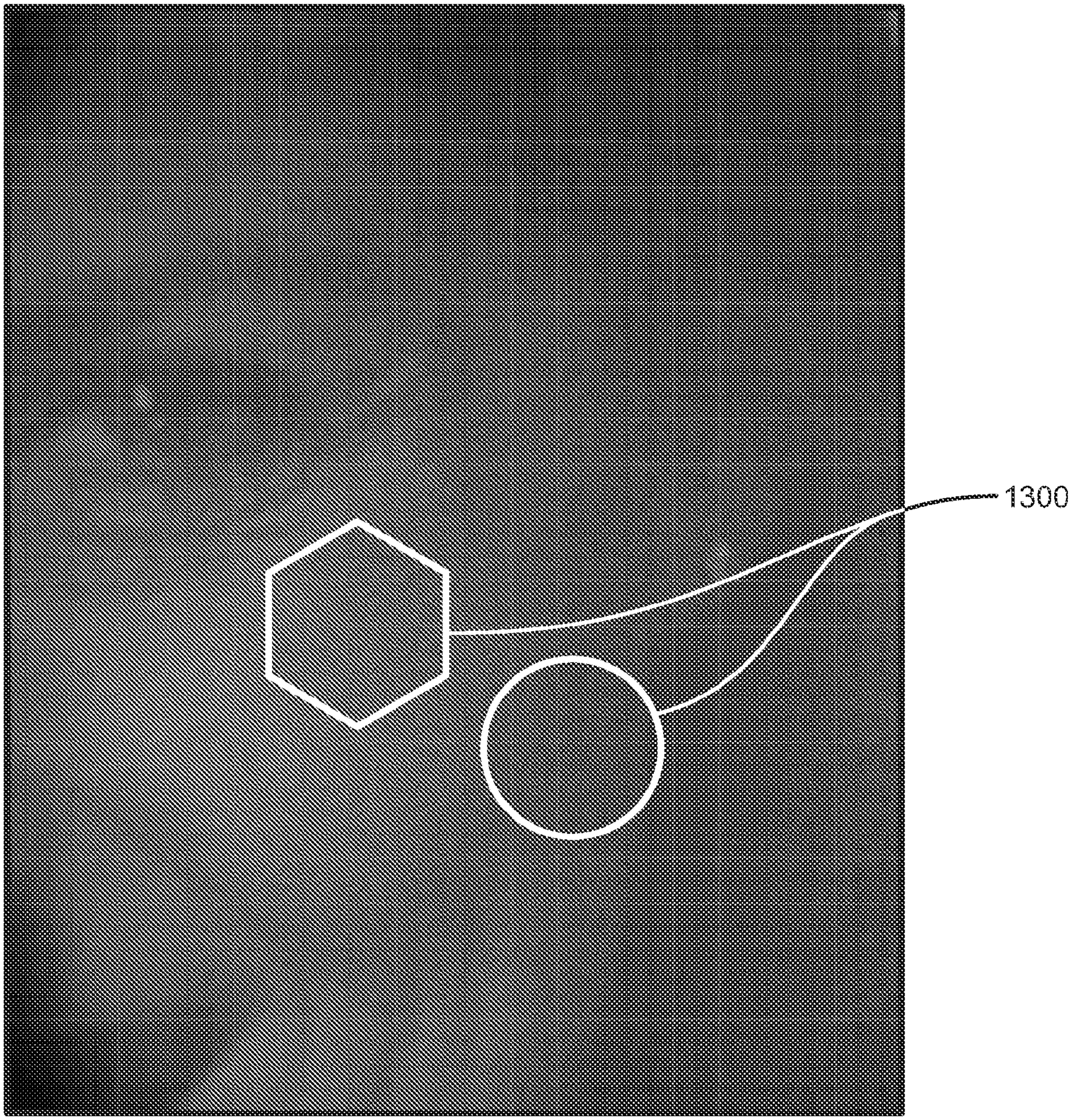
FIG. 13 illustrates an image having examples of artifacts due to interference between dithered display data and a checkerboard bias voltage pattern.

FIG. 13 illustrates an image having examples of artifacts due to interference between dithered display data and a checkerboard bias voltage pattern. As illustrated in FIG. 13, the displayed image includes artifacts in regions 1300 of the displayed image. These artifacts are a result of adverse interference between a checkerboard bias voltage pattern and a dithered image data pattern.

Figure 14A:
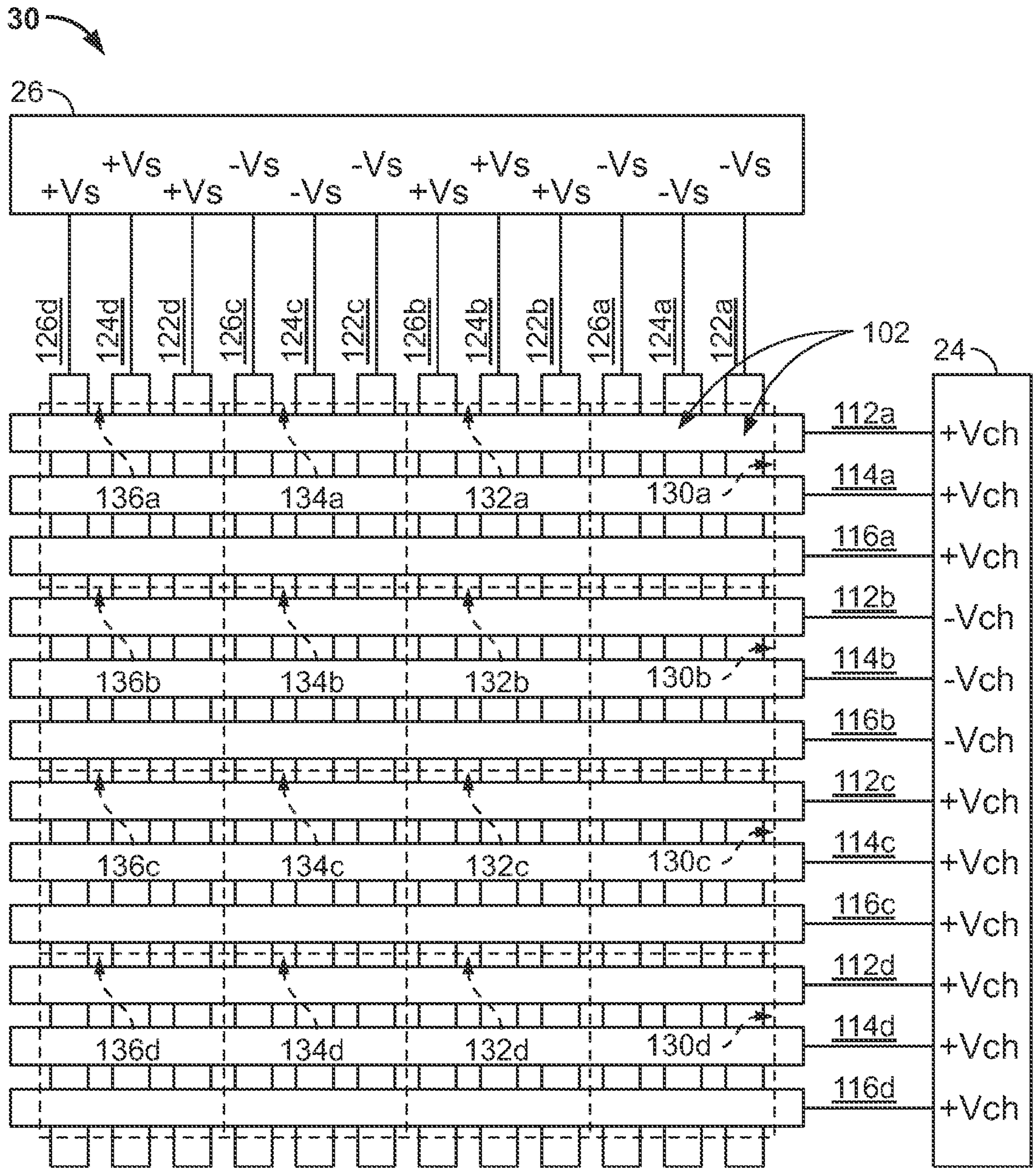
FIGS. 14A and 14B illustrate an example of a bias voltage pattern according to some implementations.
Figure 14B:
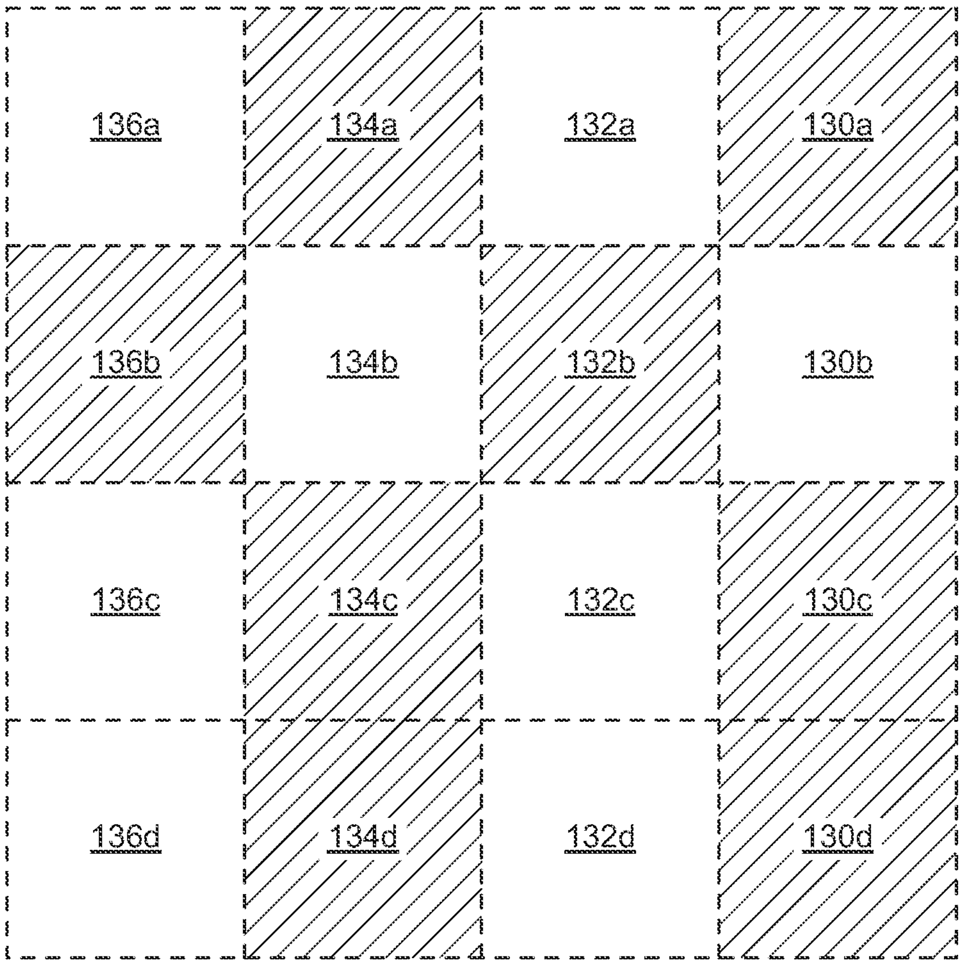

In order to avoid this interference of the bias voltage pattern with displayed image data, a hold state scheme in which the polarity is inverted at frequencies lower than the maximum possible rate in at least one dimension may be used. FIGS. 14A and 14B illustrate an example of a bias voltage pattern according to some implementations. As illustrated in FIG. 14A, the segment lines (e.g., 122*a-d*, 124*a-d*, and 126*a-d*) may be set to have a pattern of alternating polarities (e.g., $+V_s$, $-V_s$, $+V_s$, $-V_s$) from pixel to pixel. The common lines (configured to drive the array) may be set to have a different pattern of alternating polarities from pixel to pixel (e.g., $+V_{ch}$, $-V_{ch}$, $+V_{ch}$, $+V_{ch}$). The frequency at which the segment line driving signals (which may be termed the X direction) is alternated is at the maximum possible rate from pixel to pixel (e.g., alternation of polarity every three lines), while the frequency at which the common line driving signal (which may be termed the Y direction) is alternated includes frequency components less than the maximum possible rate from pixel to pixel.

The driving scheme illustrated in FIG. 14A results in a pattern of pixels (e.g., 130*a-d*, 132*a-d*, 134*a-d*, and 136*a-d*) as illustrated in FIG. 14B, where the white pixels correspond to pixels at the lower magnitude potential difference (e.g., $V_{ch}-V_s$ or $-V_{ch}+V_s$) during the hold state, and the cross-hatched correspond to pixels at the higher magnitude potential difference (e.g., $V_{ch}+V_s$ or $-V_{ch}-V_s$) during the hold state. As illustrated, the pattern of FIG. 14B is different than the checkerboard bias voltage pattern illustrated in FIG. 11B. Further, while the driving scheme is described with reference to FIGS. 14A and 14B which include an array of 4×4 pixels, the driving scheme may be used to drive a larger array of pixels (e.g., an array having 640×480 pixels, 1024×768 pixels, 1280×720 pixels, or the like).

Figures 15, 15A:
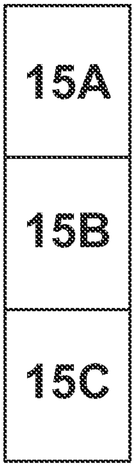

FIGS. 15A-15C collectively illustrate an example of a pseudo-random bias voltage pattern according to some implementations. The pattern illustrated in FIGS. 15A-15C includes a bias voltage pattern that can be used for a larger array of pixels. The illustrated bias voltage pattern has a size of 128 pixels in the common line direction by two pixels in the segment line direction that is repeated based on the number of pixels in a display panel. Foe example, for a 1024×768 XGA pixel array, the segment and common voltages are applied during a hold state such that the hold state voltage magnitude pattern of FIGS. 15A-15C is tiled over the pixels in six copies down and 512 copies across. Moving down through the rows of the table corresponds to the magnitude of the voltage across the display elements 102 of the pixels along the rows of a display panel (e.g., along the rows of pixels as illustrated in FIG. 14B). Moving across the columns of the table corresponds to values for the magnitude across the display elements 102 of the pixels along the columns of the display panel (e.g., along the columns of pixels as illustrated in FIG. 14B). A "+1" in the box corresponds to a higher magnitude voltage difference across the corresponding pixel of the array (e.g., having a value of $V_{ch}+V_s$ or $-V_{ch}-V_s$). A "−1" in the box corresponds to a lower magnitude voltage difference across the corresponding pixel of the array (e.g., having a value of $V_{ch}-V_s$ or $-V_{th}+V_s$). The voltage signals applied to the segment lines and the common lines in the array are generated such that the magnitude of the voltage pattern across the pixels as represented in the table of FIGS. 15A-15C is generated. The bias voltage pattern corresponding to the values in FIGS. 15A-15C has alternating polarity from pixel to pixel along a first dimension at the maximum rate, and alternating polarity along a second dimension having multiple frequency components that are less than the maximum rate from pixel to pixel.

As a result, the pattern induced on the display elements 102 is less susceptible to interference with dithered image data of the display 30. The polarity of the voltage signal of either the common lines or the segment lines may be alternated at the maximum possible rate, while the other is alternated in a pattern that includes some lower frequency components. Further, the polarity of the voltage signal of either the common lines or the segment lines may be alternated at the maximum possible rate while the other is alternated in a pattern that includes multiple frequency components that are less than the maximum possible rate. For example, if the polarity of the segment lines is alternated at the maximum rate from pixel to pixel, the polarity of the common lines may be alternated in a pattern having a frequency spectrum which includes at least one frequency component that is less than all of the frequency components of the segment line frequency spectrum.

Figure 16:
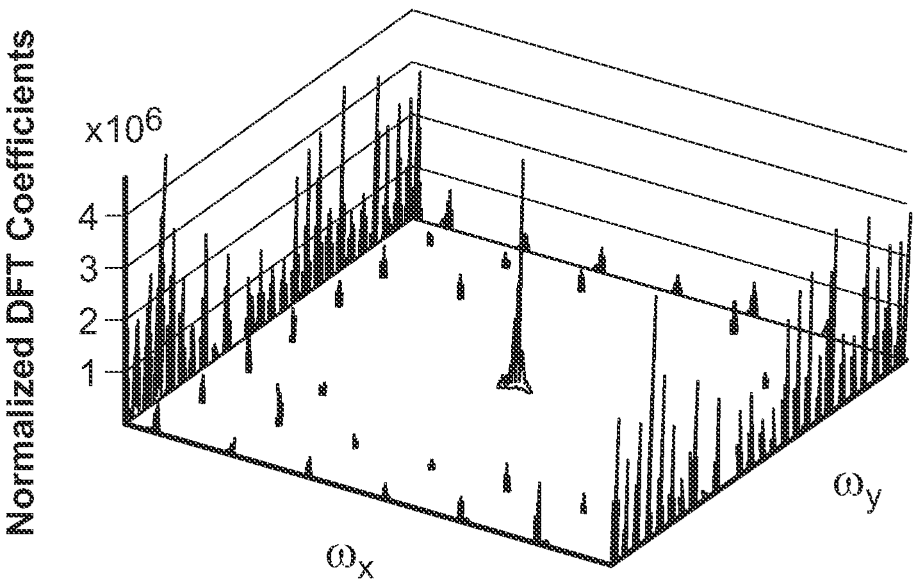
FIG. 16 illustrates a frequency domain representation of display data including the pattern of hold state voltages of FIGS. 15A-15C according to some implementations.

FIG. 16 illustrates a frequency domain representation of display data including the pattern of hold state voltages of FIGS. 15A-15C according to some implementations. As illustrated, the frequency components of the bias voltage pattern are at a maximum frequency along one dimension (e.g., as illustrated the X dimension) and are spread about the second dimension (e.g., as illustrated the Y dimension) of the frequency spectrum. One/a person having ordinary skill will recognize that the frequency components may alternatively be at the maximum frequency along the Y dimension, and be spread along the X dimension.

The hold state scheme described with reference to FIGS. 14-16 may reduce the visibility of the bias voltage pattern. First, the bias voltage pattern includes high frequency DFT coefficients. For example, as discussed above, the bias voltage pattern includes DFT coefficients having a maximum value along one dimension (e.g., a maximum value along the X direction as illustrated in FIG. 16). As a result, the bias voltage pattern is less visible due to the low sensitivity of the human visual system to high frequency variations in brightness of a displayed image.

Further, the maximum energy of any of the DFT coefficients of the hold state pattern is reduced relative to the checkerboard bias voltage pattern by introducing what may be referred to as "noise" in the hold state voltage pattern along at least one of the two dimensions of the array. The noise may be random or pseudo-random With this added noise, the frequency components of the bias voltage pattern may be spread along several locations of the frequency spectrum along at least one dimension. As illustrated in FIG. 16, the frequency components of the pattern are spread along the Y dimension. Further, the energy may be spread such that higher energy components are located mostly in locations of higher frequency along the Y dimension, and lower energy components are located in the lower frequencies (e.g., the central region along the Y dimension as illustrated in FIG. 16). Weighting the frequency components toward higher frequencies may help reduce visibility of the pattern by maintaining most energy at the higher frequencies where the human visual system is less sensitive. Although the implementations of FIGS. 14, 15, and 16 illustrate a bias pattern having multiple frequency components in one dimension and a single frequency component in the other dimension, multiple frequency components may be utilized in both dimensions in some implementations. For example, a frequency spectrum along one dimension may include a plurality of frequency components while the frequency spectrum along the other dimension may also include a plurality of frequency components. In some implementations, the frequency components in both dimensions include frequency components that are of higher magnitude at greater frequencies and that are of lower magnitude at lower frequencies. In such an implementation, the pattern definition may be, for example, defined by a table similar to that shown in FIG. 15 which is a 128 row×128 column square table, rather than the 128 row×2 column rectangle of FIG. 15.

In some implementations, the bias voltage pattern in one dimension contains one or more frequency components in that dimension that are lower than all frequency components in the bias voltage pattern along the other dimension.

Figure 17:
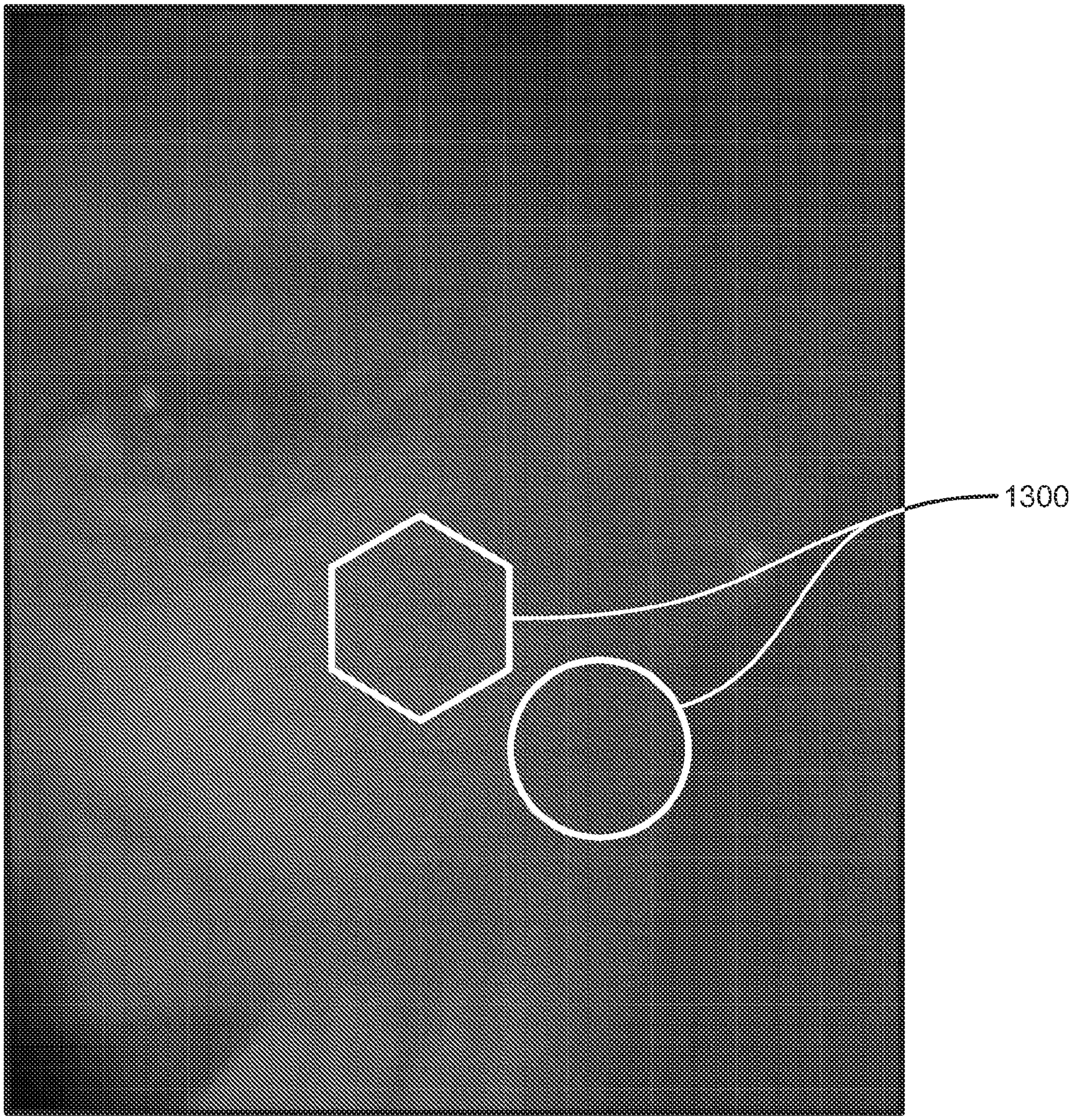
FIG. 17 illustrates an image having reduced artifacts by application of a pseudo-random bias voltage pattern according to some implementations.

As a result of the multiple frequency components in at least one dimension of the hold state bias voltage pattern, a dithered image data pattern is less susceptible to interference by the bias voltage pattern. FIG. 17 illustrates an image having reduced artifacts by application of a pseudo-random bias voltage pattern according to some implementations. As illustrated in FIG. 17, the image includes reduced artifacts in the regions 1300 relative to the artifacts presents in the same regions 1300 of the image in FIG. 13.

Figure 18:
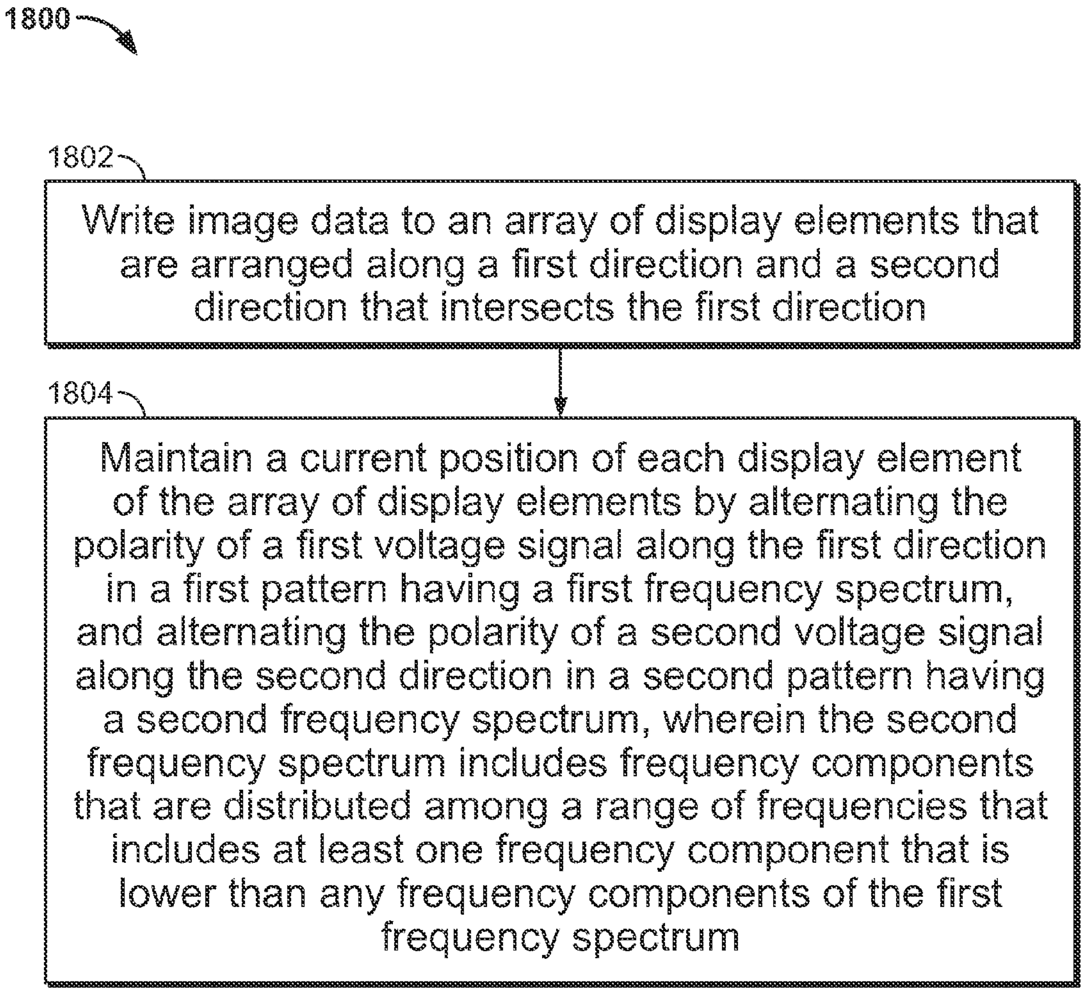
FIG. 18 illustrates a flow chart of a method of driving a display according to some implementations.

FIG. 18 illustrates a flow chart of a method of driving a display 30 according to some implementations. The method 1800 includes writing image data to an array of display elements 102 that are arranged along a first direction and a second direction that intersects the first direction as illustrated by block 1802. For example, the array of display elements 102 may include an array having rows of display elements 102 and columns of display elements 102. As illustrated in block 1804, a current position of each display element 102 of the array of display elements 102 is maintained by alternating a polarity of a first voltage signal along the first direction in a first pattern having a first frequency spectrum, and alternating the polarity of a second voltage signal along the second direction in a second pattern having a second frequency spectrum, wherein the at least one of the first and second frequency spectrums includes a plurality of frequency components.

Figure 19A:
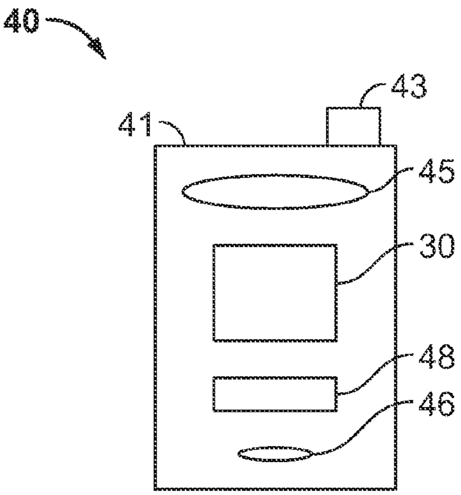
FIGS. 19A and 19B show examples of system block diagrams illustrating a display device that includes a plurality of interferometric modulators.
Figure 19B:
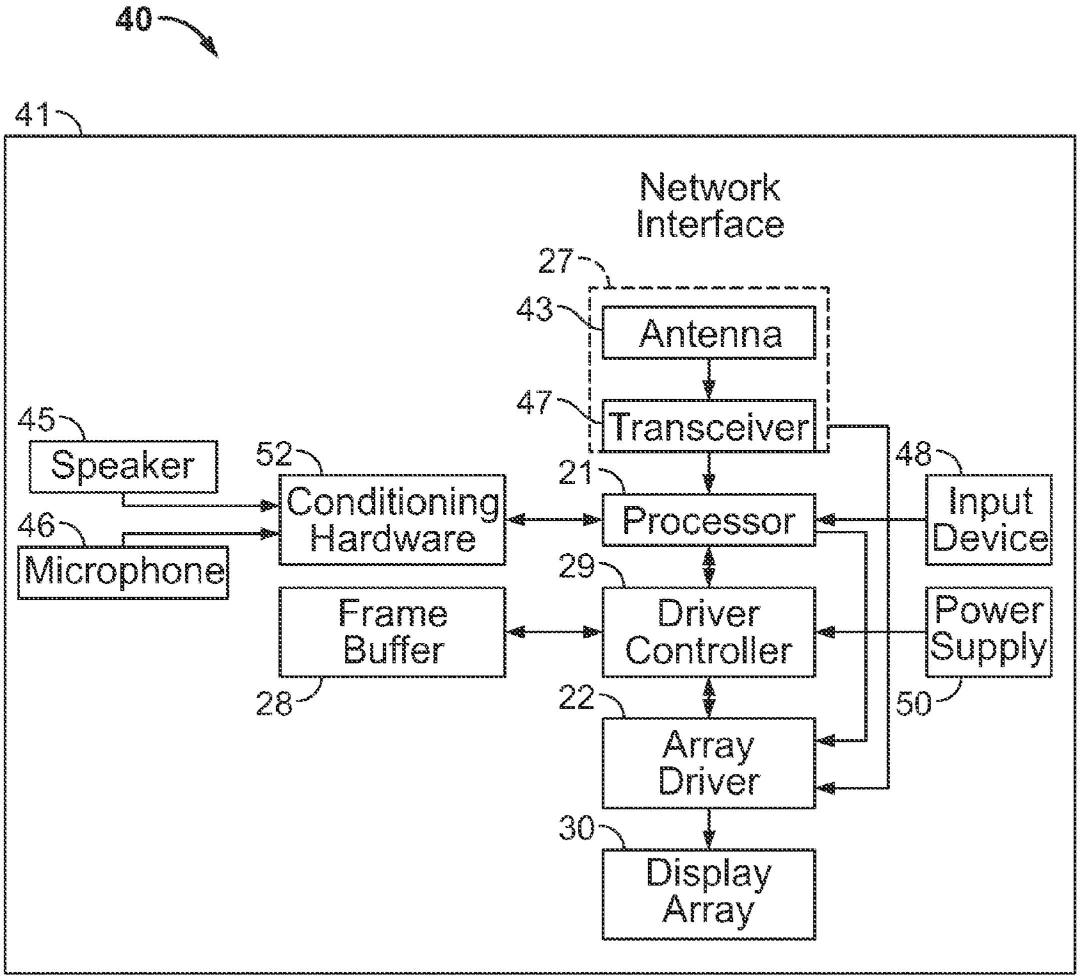

FIGS. 19A and 19B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 19B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone. Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly tenned a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of displaying an image on a display, the display including display elements arranged in an array having a first direction and a second direction that intersects the first direction, the method comprising:

writing image data to the array of display elements; and maintaining a current position of each display element of the array of display elements, wherein maintaining a current position includes alternating the polarity of a first voltage signal along the first direction in a first pattern having a first frequency spectrum, and alternating the polarity of a second voltage signal along the second direction in a second pattern having a second frequency spectrum, wherein at least one of the first and second frequency spectrums includes a plurality of frequency components, and wherein the first frequency spectrum corresponds to a pattern of polarities of voltage signals applied to rows of display elements, and wherein the second frequency spectrum corresponds to a pattern of polarities of voltage signals applied to columns of display elements.

2. The method of claim 1, wherein the second frequency spectrum includes frequency components that are distributed among a range of frequencies that includes at least one frequency component that is lower than any frequency components of the first frequency spectrum.

3. The method of claim 1, wherein the first and second frequency spectrums each include frequency components that are distributed among a range of frequencies.

4. The method of claim 1, wherein the second frequency spectrum includes multiple frequency components lower than any frequency components of the first frequency spectrum.

5. The method of claim 1, wherein the array includes a plurality of pixels each including a plurality of display elements, and wherein the first pattern is a pixel by pixel polarity alternation.

6. An apparatus for driving a display, the display including display elements arranged in an array having a first direction and a second direction that intersects the first direction, the apparatus comprising:

a first driver configured to drive the array of display elements, the first driver including a plurality of first driving signal lines connected to the array of display elements along the first direction; and a second driver to drive the array of display elements, the second driver including a plurality of second driving signal lines connected to the array of display elements along the second direction, wherein the first driver is configured to maintain a current position of each display element of the array of display elements by alternating a polarity of the plurality of first driving signal lines in a first pattern having a first frequency spectrum, wherein the second driver is configured to alternate the polarity of the plurality of second driver signal lines in a second pattern having a second frequency spectrum, and wherein at least one of the first and second frequency spectrums includes a plurality of frequency components, and wherein the first frequency spectrum corresponds to alternating polarities of voltage signals along a row of display elements, and wherein the second frequency spectrum corresponds to alternating polarities of voltage signals along a column of display elements.

7. The apparatus of claim 6, wherein the second frequency spectrum includes frequency components that are distributed among a range of frequencies that includes at least one frequency component that is lower than any frequency components of the first frequency spectrum.

8. The apparatus of claim 6, wherein the first and second frequency spectrums each include frequency components that are distributed among a range of frequencies.

9. The apparatus of claim 6, wherein the second frequency spectrum includes multiple frequency components lower than any frequency components of the first frequency spectrum.

10. The apparatus of claim 6, wherein the first driver is a common driver, and wherein the second driver is a segment driver.

11. The apparatus of claim 6, wherein the first driver is a segment driver, and wherein the second driver is a common driver.

12. The apparatus of claim 6, further comprising:

a processor that is configured to communicate with the display, the processor being configured to process image data; and a memory device that is configured to communicate with the processor.

13. The apparatus of claim 12, further comprising:

an input device configured to receive input data and to communicate the input data to the processor.

14. The apparatus of claim 12, further comprising:

an image source module configured to send the image data to the processor.

15. The apparatus of claim 14, wherein the image source module includes at least one of a receiver, transceiver, and transmitter.

16. The apparatus of claim 6, further comprising:

a controller configured to send at least a portion of the image data to at least one of the first driver and the second signal driver.

17. The apparatus of claim 6, wherein the array includes a plurality of pixels each including a plurality of display elements, and wherein the first pattern is a pixel by pixel polarity alternation.

18. An apparatus for displaying an image on a display, the display including display elements arranged in an array having a first direction and a second direction that intersects the first direction, the apparatus comprising:

means for writing image data to the array of display elements;

means for maintaining a current position of each display element of the array of display elements, wherein the means for maintaining a current position includes means for alternating the polarity of a first voltage signal along the first direction in a first pattern having a first frequency spectrum, and means for alternating the polarity of a second voltage signal along the second direction in a second pattern having a second frequency spectrum, wherein at least one of the first and second frequency spectrums includes a plurality of frequency components, and wherein the first frequency spectrum corresponds to a pattern of polarities of voltage signals along rows of display elements, and wherein the second frequency spectrum corresponds to a pattern of polarities of voltage signals along columns of display elements.

19. The apparatus of claim 18, wherein the second frequency spectrum includes frequency components that are distributed among a range of frequencies that includes at least one frequency component that is lower than any frequency components of the first frequency spectrum.

20. The method of claim 18, wherein the first and second frequency spectrums each include frequency components that are distributed among a range of frequencies.

21. The apparatus of claim 18, wherein the means for alternating a first voltage signal includes one of a segment line driver and a common line driver, and wherein the means for alternating a second voltage signal includes the other of the segment line driver and common line driver.

22. The apparatus of claim 18, wherein the second frequency spectrum includes multiple frequency components lower than any frequency components of the first frequency spectrum.

23. The apparatus of claim 18, wherein the array includes a plurality of pixels each including a plurality of display elements, and wherein the first pattern is a pixel by pixel polarity alternation.

24. A computer program product for processing data for a program configured to drive a display including a plurality display elements arranged in an array having a first direction and a second direction that intersects the first direction, the computer program product comprising:

a non-transitory computer-readable medium having stored thereon code for causing processing circuitry to:

write image data to the array of display elements; and maintain a current position of each display element of the array of display elements, wherein maintaining a current position includes alternating the polarity of a first voltage signal along the first direction in a first pattern having a first frequency spectrum, and alternating the polarity of a second voltage signal along the second direction in a second pattern having a second frequency spectrum, wherein at least one of the first and second frequency spectrums includes a plurality of frequency components, wherein the first frequency spectrum corresponds to a pattern of polarities of voltage signals along rows of display elements, and wherein the second frequency spectrum corresponds to a pattern of polarities of voltage signals along columns of display elements.

25. The computer program product of claim 24, wherein the second frequency spectrum includes frequency components that are distributed among a range of frequencies that includes at least one frequency component that is lower than any frequency components of the first frequency spectrum.

26. The computer program product of claim 24, wherein the first and second frequency spectrums each include frequency components that are distributed among a range of frequencies.

27. The computer program product of claim 24, wherein the second frequency spectrum includes multiple frequency components lower than any frequency components of the first frequency spectrum.

28. The computer program product of claim 24, wherein the array includes a plurality of pixels each including a plurality of display elements, and wherein the first pattern is a pixel by pixel polarity alternation.

* * * * *